United States Patent [19]
Okabe et al.

[11] 3,929,966
[45] Dec. 30, 1975

[54] METHOD FOR REMOVING OXIDES OF NITROGEN FROM GASEOUS MIXTURES

[75] Inventors: Taijiro Okabe; Akitsugu Okuwaki, both of Sendai; Shigetoshi Nakabayashi, Shinminato, all of Japan

[73] Assignee: Mitsubishi Kinzoku Kabushiki Kaisha, Japan

[22] Filed: Feb. 16, 1973

[21] Appl. No.: 332,792

[30] Foreign Application Priority Data
Feb. 19, 1972 Japan.............................. 47-17556

[52] U.S. Cl. .............................................. 423/239
[51] Int. Cl.$^2$...................... B01J 8/00; C01B 21/00
[58] Field of Search .......... 423/235, 239, 599, 402, 423/404, 212, 213, 395; 252/471; 55/68, 74

[56] References Cited
UNITED STATES PATENTS

| | | | |
|---|---|---|---|
| 956,120 | 4/1910 | Machalske.......................... | 423/599 |
| 1,318,891 | 10/1919 | MacMillan.......................... | 423/599 |
| 1,616,900 | 2/1927 | Kassner.............................. | 423/395 |
| 3,207,704 | 9/1965 | Stephens et al................. | 423/213 X |
| 3,214,236 | 10/1965 | Weisz................................. | 423/213 |
| 3,512,925 | 5/1970 | Buechler............................ | 423/219 |
| 3,575,848 | 4/1971 | Miale................................. | 252/471 |

FOREIGN PATENTS OR APPLICATIONS

| | | | |
|---|---|---|---|
| 226,568 | 9/1968 | U.S.S.R............................. | 423/239 |

OTHER PUBLICATIONS

Petriashuili, et al., "Stability of Potassium Permanganate and Manganate in Potassium Hydroxide Solutions," Chem. Abstracts, Vol. 73, 1970, No. 115944k.
Kobakhidze, Chem. Abstr., No. 8000b, Vol. 54, (1960).
Purtseladze et al., Chem. Abstr., No. 8555g, Vol. 53, (1959).
Vecera et al., Chem. Abstr., No. 20671a, Vol. 54, (1960).

Primary Examiner—Oscar R. Vertiz
Assistant Examiner—Brian E. Hearn
Attorney, Agent, or Firm—Wenderoth, Lind & Ponack

[57] ABSTRACT

A method for removing oxides of nitrogen from gaseous mixtures by contacting the gaseous mixtures with alkali manganate.

3 Claims, No Drawings

METHOD FOR REMOVING OXIDES OF NITROGEN FROM GASEOUS MIXTURES

This invention relates to a method for removing oxides of nitrogen from gaseous mixtures containing such oxides of nitrogen. More particularly, it is concerned with a removal of the oxides of nitrogen from atmospheric air and other gaseous mixtures containing therein oxides of nitrogen such as nitrogen monoxide (NO) and nitrogen dioxide ($NO_2$) by chemical treatment of such gaseous mixtures with a treating agent consisting of alkali manganate which is capable of oxidizing NO and $NO_2$, and of reactively absorbing $NO_2$.

It has been too well recognized that exhaust gases from internal combustion engines, nitric acid production plants, thermoelectric power plants, and so forth contain considerable amount of oxides of nitrogen which is liable to bring about public harm (or the so-called "air-pollution") in the form of photo-chemical smog, etc. And, measures have already been taken on a practical and industrialized scale against the nitric acid production plants, in particular, which discharge a large quantity of waste gas containing high concentration of oxides of nitrogen, so as to remove such undesirable pollutant by various ways such as washing with alkali, contact-decomposition of the pollutant with hydrogen, methane, etc., in the presence of a metallic oxide catalyst, or others. In case, however, the exhaust gas contains low concentration of oxides of nitrogen such as that discharged from thermo-electric power plant or a small scale internal combustion engine, or such exhaust gas is discharged and scattered around in a small quantity, there has so far been no effective method of removing the oxides of nitrogen from such exhaust gas, and this has resulted in great social problem.

As the method of treating exhaust gas from small scale internal combustion engines, there has been conducted researches and studies mainly focussed on the contact-decomposition of the oxides of nitrogen with a reductive substance such as hydrogen, hydrocarbons, ammonia, carbon monoxide, etc. in the presence of a catalyst principally composed of metallic oxides of iron, copper, chromium, nickel, platinum, cobalt, aluminum, molybdenum, vanadium etc., to render the exhaust gas non-poisonous. However, no satisfactory result has been obtained for the reason that activity of the catalyst rapidly lowers due to adherence thereto of tars and ashes in the exhaust gas as well as deposition of carbon substances.

On the other hand, removal of the oxides of nitrogen by reactive absorption has been publicly known, and solutions of ferrous sulfate and potassium permanganate have been known as an aqueous absorbent to NO, solutions of alkali hydroxide and alkali carbonate to $NO_2$, and $PbO_2$ and $Na_2O_2$ have also been known as a solid absorbent to NO, and alkali hydroxide, alkali carbonate, and $PbO_2$ to $NO_2$.

However, this absorption method has yet to attain its application in an industrialized scale to remove oxides of nitrogen in the gaseous mixtures containing therein both NO and $NO_2$, since there has been discovered no effective absorbent capable of absorbing both NO and $NO_2$ simultaneously.

As the result of reviewing and studying made by the present inventors on the afore-mentioned known methods of removing oxides of nitrogen, it has been concluded that the fundamental solution to removal of the oxides of nitrogen is nothing but the reactive absorption, based on which conclusion further researches have been conducted on various sorts of compounds to determine those having ideal capability of absorbing the oxides of nitrogen.

The following view points have been established as the result of the researches.

1. NO, in its original form, can be absorbed in only a very special type of absorbent such as ferrous sulfate, so that kind of the absorbent is extremely limited.
2. $NO_2$ is readily absorbed in alkali metal compounds of alkaline property.
3. Accordingly, in the absorption of the oxides of nitrogen, the oxidation process of NO constitutes an important factor, for the perfect oxidation of which any one of the following ways should be resorted to.
    a. NO is first oxidized to $NO_2$ by use of a strong oxidizer, followed by absorption of $NO_2$ by alkaline substance.
    b. By use of an absorbent having both oxidizing and alkaline properties, the nitrogen oxide is absorbed at once.

Based on this notion, detailed examinations were made on various sorts of compounds having practical absorbing capability, least toxicity, least inflammability, least explosiveness, and being available at a low price, and have finally found out that alkali manganate having both oxidizing and alkaline properties, and a substance obtained by heat-treating manganese ore with alkali hydroxide possess far superiority to the abovementioned $PbO_2$ in its absorbing capability to the oxides of nitrogen, and yet are not instable as $Na_2O_2$.

It is therefore a primary object of the present invention to provide an effective method of removing oxides of nitrogen (NO, $NO_2$) present in exhaust gas from various sources.

It is another object of the present invention to provide a method of removing oxides of nitrogen (NO, $NO_2$) existing in gaseous mixtures by subjecting the gaseous mixture to contact-reaction with a treating agent containing alkali manganate, or another treating agent containing both alkali compound and a manganese-containing substance which produces alkali manganate at the time of using, thereby reactively absorbing NO and $NO_2$ into this agent.

The foregoing objects and actual reactions to take place during the treatment will become more clearly understood from the following detailed description of the invention in conjunction with a few preferred examples.

For alkali manganate, there have been known potassium manganate ($K_2MnO_4$) and sodium manganate ($Na_2MnO_4$), both of which are not available in general market. However, they can be produced fairly easily. For example, potassium manganate is produced as an intermediate product, when $KMnO_4$ is to produced, by adding potassium hydroxide to manganese ore and heat-treating the same at a temperature of 250° to 300°C. The reaction in this case is as follows.

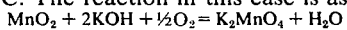

For the production of $KMnO_4$, this intermediate product from the heat reaction is eluted with water to prepare an aqueous solution of $K_2MnO_4$, which is further electrolytically oxidized to $KMnO_4$.

Thus, $K_2MnO_4$ is the intermediate product to be obtained in the course of $KMnO_4$ production, so that it can be obtained in less process steps than to obtain KMnO₄ and at a low cost. Na₂MnO₄ can also be produced in the same manner as K₂MnO₄.

Both K₂MnO₄ and Na₂MnO₄ are not necessarily pure. Rather, those which have been obtained by heat-treating manganese ore or manganese ocean nodules together with alkali hydroxide at a temperature to produce alkali manganate possess excellent absorbing capability to oxides of nitrogen without purification. Furthermore, when such alkali manganate is to be used at a temperature of 200°C and above, a simple mixture of manganese ore and alkali hydroxide can even exhibit such excellent absorbing capability without it being subjected to any preliminary heat-treatmemt to turn the same into alkali manganate. Accordingly, there is no stringent requirement for purity of alkali manganate used for the purposes of the present invention.

The method according to the present invention can be applied to both wet and dry treatments. The treatment temperature for the dry treatment ranges from 200° to 600°C, or, more preferably, from 300° to 500°C. Since alkali manganate does not undergo eminent decomposition upto 600°C, it can be safely used in the dry treatment. Moreover, alkali manganate, when it is dissolved in water, is hydrolyzed to become $KMnO_4$, and deposits manganese oxide ($MnO_2$). As it does not hydrolyze in alkali hydroxide solution, but dissolves in it, the compound is usually used in alkaline solution in case of the wet treatment.

The reactions between potassium manganate ($K_2MnO_4$) and the oxides of nitrogen (NO, $NO_2$) are as shown in the following chemical equations, $K_2MnO_4 + 2NO_2 = 2KNO_3 + MnO_2$
$K_2MnO_4 + 2NO = 2KNO_2 + MnO_2$
$3K_2MnO_4 + 2NO + 2H_2O = 2KNO_3 + 4KOH + 3MnO_2$.

The absorbing capability of alkali manganate with respect to the oxides of nitrogen is invariable even in the presence of carbon monoxide (CO) or carbon dioxide ($CO_2$).

The method of the present invention is applicable to remove the oxides of nitrogen existing in exhaust gas from various sources such as small scale internal combustion engines, nitric acid production plants, thermoelectric power plants, and so forth.

As stated in the foregoing, the present invention, which utilizes a particular absorbing agent principally consisting of alkali manganate, can exhibit highly improved rate of removal of oxides of nitrogen in comparison with the conventional methods, hence it provides extremely effective means to solve the air-pollution problems we are facing nowadays, the industrial merit of which is therefore considered great.

For the purpose of enabling those skilled in the art to reduce this invention into practice, the following preferred examples are presented. It should, however, be noted that these examples are illustrative only and do not limit the scope of the present invention.

EXAMPLE 1

Quartz boards, on which various kinds of sample absorbing agents in powder in a quantity of 0.3 to 0.7 g are placed, are accommodated in a quartz reaction tube maintained at a temperature of 400°C in an electric furnace.

Into this quartz reaction tube, a gaseous mixture containing 6.4% or so of oxides of nitrogen ($NO_x$), in which the ratio of NO to $NO_2$ is 1 : 10, is introduced, and subjected to reaction with the absorbents for 2 hours.

After 2 hours' reaction, the absorbing capability of each absorbent is measured, and the results as shown in the following Table 1 is obtained. (The abovementioned $NO_x$-containing gas is prepared by burning air containing about 6 % of ammonia at approximately 800°C while passing through a platinum catalyst, thereafter cooling it with water, and removing moisture therefrom through a dessicator containing phosphorus pentoxide. The absorbed quantity of the oxides of introgen is measured by the Kjeldahl method, and expressed in terms of the quantity of $NO_2$.)

As is apparent from Table 1, the absorbing agent

Table 1

Absorbing Capability of $NO_x$ of Absorbing Agent at 400°C

| Absorbing Agent | Quantity (g) | Absorbed Quantity (g.$NO_2$) | Absorbing Capability (g.$NO_2$/ g.Absorbent) |
|---|---|---|---|
| K₂MnO₄ (1) | 0.3434 | 0.1271 | 0.370 |
| roasted mixture of KOH and manganese ocean nodule (2) | 0.7076 | 0.2222 | 0.314 |
| roasted mixture of NaOH and manganese ore (3) | 0.3731 | 0.1945 | 0.521 |
| K₂CO₃ +MnO₂ (4) | 0.6638 | 0.1481 | 0.223 |
| NaOH +MnO₂ (5) | 0.6670 | 0.2337 | 0.354 |
| MnO₂ (6) | 0.3891 | 0.0006 | 0.002 |
| PbO₂ (6) | 0.4881 | 0.0329 | 0.067 |
| KMnO₄ (6) | 0.3157 | 0.0505 | 0.160 |

NOTE:
(1) 300 g of primary KOH and 100 g of primary KMnO₄ are dissolved in 500 ml of water, and the solution was boiled for 7 hours. After the boiling, it was cooled, and the produced crystals of K₂MnO₄ were filtered and dessicated with silica gel.
(2) To pulverized manganese ocean nodule of −150 meshes (Mn content of 23.3%), KOH is added so as to make the KOH/MnO₂ mol/l ratio to be 2.5, and the mixture is roasted for 5 hours at 450°C.
(3) To pulverized soft manganese or of −150 meshes (Mn content of 48.5%), NaOH is added so as to make the NaOH/MnO₂ mol/l ratio to be 2.5, and the mixture is roasted for 2 hours at 350°C.
(4) A mixture of 0.3186 g of K₂CO₃ and 0.3458 g of MnO₂
(5) A mixture of 0.3598 g of NaOH and 0.3072 g of MnO₂
(6) Primary reagent is used as it is.

provided with conditions which produce or contain potassium manganate or sodium manganate possesses far greater absorbing capability of $NO_x$ than lead oxide and potassium permanganate which are known to be the conventional absorbent of $NO_x$ and to have the absorbing action only in the state of aqueous solution.

EXAMPLE 2

In the same manner as in Example 1 above, variations in absorbing quantity of potassium manganate with respect to $NO_x$ depending on temperature are examined, and the results shown in the following Table 2 is obtained.

Table 2

| Temperature (°C) | Change in Absorbing Quantity of $NO_x$ by $K_2MnO_4$ due to Temperature Variations | | | | |
| --- | --- | --- | --- | --- | --- |
| | 200 | 300 | 400 | 500 | 600 |
| Weight of Specimen (g) | 0.3768 | 0.4047 | 0.3434 | 0.3639 | 0.3625 |
| Quantity Absorbed (g.$NO_2$) | 0.0567 | 0.1598 | 0.1291 | 0.1265 | 0.0951 |
| Absorbing Capability (g. $NO_2$/g.$KMnO_4$) | 0.156 | 0.395 | 0.376 | 0.348 | 0.262 |

EXAMPLE 3

Two absorbing bottles (30 mm$\phi$ 250 mm) are connected in series, into which a mixed solution of potassium manganate (0.2 mol) and caustic potash (2 mols) is put in a quantity of 60 ml and 40 ml, respectively, and $NO_x$-containing gas as used in Example 1 is introduced at a rate of 500 ml/min. for 2 hours. The rate of absorbing $NO_x$ reached 100%.

In the same experiment using an aqueous solution of potassium permanganate, the ratio of absorption of $NO_x$ is as low as 85% in comparison with the case of using aqueous solution of potassium manganate.

What we claim is:

1. A method for removing oxides of nitrogen ($NO_x$) existing in gaseous mixtures which consists essentially of subjecting said gaseous mixtures to contact-reaction with an alkali metal manganate at a temperature of from 200°C to 600°C, thereby absorbing the oxides of nitrogen into said alkali metal manganate.

2. The method according to claim 1, in which said alkali metal manganate is one selected from the group consisting of potassium manganate and sodium manganate.

3. The method according to claim 1, in which the contact reaction is conducted at a temperature range of 300° to 500°C.

* * * * *